United States Patent
Palmas et al.

(10) Patent No.: US 10,011,791 B2
(45) Date of Patent: Jul. 3, 2018

(54) CATALYST REGENERATING METHODS AND APPARATUSES AND METHODS OF INHIBITING CORROSION IN CATALYST REGENERATING APPARATUSES

(71) Applicant: UOP LLC, Des Plaines, IL (US)

(72) Inventors: Paolo Palmas, Des Plaines, IL (US); James W. Althoff, Chicago, IL (US); Sanford Allan Victor, Buffalo Grove, IL (US)

(73) Assignee: UOP LLC, Des Plaines, IL (US)

( * ) Notice: Subject to any disclaimer, the term of this patent is extended or adjusted under 35 U.S.C. 154(b) by 42 days.

(21) Appl. No.: 14/525,755

(22) Filed: Oct. 28, 2014

(65) Prior Publication Data

US 2016/0114316 A1 Apr. 28, 2016

(51) Int. Cl.

| | | |
|---|---|---|
| *B01J 8/24* | (2006.01) | |
| *C10G 75/02* | (2006.01) | |
| *B01J 8/18* | (2006.01) | |
| *B01J 8/26* | (2006.01) | |
| *B01J 8/28* | (2006.01) | |

(Continued)

(52) U.S. Cl.
CPC ............. *C10G 75/02* (2013.01); *B01J 8/002* (2013.01); *B01J 8/003* (2013.01); *B01J 8/0055* (2013.01); *B01J 8/1863* (2013.01); *B01J 8/26* (2013.01); *B01J 8/28* (2013.01); *B01J 8/388* (2013.01); *B01J 19/02* (2013.01); *C10G 11/182* (2013.01); *B01J 8/0015* (2013.01); *B01J 29/90* (2013.01); *B01J 38/30* (2013.01); *B01J 2208/00849* (2013.01); *B01J 2208/00902* (2013.01); *B01J 2208/00911* (2013.01);

(Continued)

(58) Field of Classification Search
CPC ............. B01L 8/24; B01L 8/28; C10G 75/02
See application file for complete search history.

(56) References Cited

U.S. PATENT DOCUMENTS 5,063,028 A   11/1991   Humble et al.
7,883,784 B2   2/2011   Apte et al.

FOREIGN PATENT DOCUMENTS

| CN | 1197099 A | * 10/1998 |
|---|---|---|
| JP | 2012214787 A | 11/2012 |
| WO | 2014009625 A | 1/2014 |

OTHER PUBLICATIONS

Acid Proof castable & Mastic coating, http://pkg.koreasme.com/sales/mastic_coating.html, publication date not available.

* cited by examiner

*Primary Examiner* — Aileen B Felton

(57) ABSTRACT

Methods and apparatuses for regenerating catalysts and methods of inhibiting corrosion in catalyst regenerating apparatuses are provided. An exemplary apparatus includes: a metal vessel configured to receive a spent catalyst stream and contact at least a portion of the spent catalyst stream with an oxygen containing environment at a sufficiently high temperature to burn coke present in the spent catalyst stream; a refractory material overlying at least a portion of an inner surface of the metal vessel; and a corrosion inhibiting material in contact with at least a portion of the inner surface of the metal vessel and disposed between the inner surface and at least a portion of the refractory material, wherein the corrosion inhibiting material is heat stable at a temperature of at least up to about 400° F. (about 204° C.) and inhibits contact of an acid environment with the inner surface of the metal vessel.

13 Claims, 2 Drawing Sheets

(51) Int. Cl.
*B01J 8/38* (2006.01)
*B01J 19/02* (2006.01)
*B01J 8/00* (2006.01)
*C10G 11/18* (2006.01)
B01J 38/30 (2006.01)
B01J 29/90 (2006.01)

(52) U.S. Cl.
CPC .............. *B01J 2208/00991* (2013.01); *B01J 2219/024* (2013.01); *B01J 2219/0245* (2013.01)

CATALYST REGENERATING METHODS AND APPARATUSES AND METHODS OF INHIBITING CORROSION IN CATALYST REGENERATING APPARATUSES

TECHNICAL FIELD

The technical field generally relates to methods and apparatuses for catalyst regeneration and methods of inhibiting corrosion in a catalyst regeneration apparatus and more particularly relates to catalyst regenerating methods and apparatuses that utilize a corrosion inhibiting material and methods for inhibiting corrosion in catalyst regenerating apparatuses using such material.

BACKGROUND

Fluid catalytic cracking (FCC) is a hydrocarbon conversion process accomplished by contacting hydrocarbons in a fluidized reaction zone with a catalyst composed of finely divided particulate material. The reaction in catalytic cracking, as opposed to hydrocracking, is carried out in the substantial absence of added hydrogen or the consumption of hydrogen. As the cracking reaction proceeds, substantial amounts of highly carbonaceous material referred to as coke is deposited on the catalyst. Conventionally, a high temperature regeneration operation within a regenerator zone is used to combust coke from the catalyst, thereby regenerating the catalyst. Catalyst containing coke, referred to herein as spent catalyst, is continually removed from the reaction zone and replaced by essentially coke-free catalyst from the regeneration zone. Fluidization of the catalyst particles by various gaseous streams allows the transport of catalyst between the reaction zone and regeneration zone.

A common objective of these configurations is maximizing product yield from the reactor while minimizing operating and equipment costs. Optimization of feedstock conversion ordinarily requires essentially complete removal of coke from the catalyst. This essentially complete removal of coke from catalyst is often referred to as complete regeneration. In order to obtain complete regeneration, the catalyst has to be in contact with oxygen for sufficient residence time to permit thorough combustion.

Conventional catalyst regenerators typically include a vessel having a spent catalyst inlet, a regenerated catalyst outlet and a combustion gas distributor for supplying air or other oxygen-containing gas to the bed of catalyst that resides in the vessel. Cyclone separators remove catalyst entrained in a flue gas before the gas exits the regenerator vessel. The interior of the vessel conventionally includes some refractory material that serves to insulate the vessel from its contents. However, portions of the vessel typically have areas of stagnant catalyst, which results in low temperatures at or near portions of the vessel walls. In some instances, temperatures at or near the vessel walls may be about 200° F. (about 93° C.) or less. This is a problem because the dew point for condensation of sulfuric acid under typical catalyst regeneration operating conditions is on the order of about 400° F. (about 204° C.). Thus, conventional catalyst regenerators operate under conditions whereby sulfuric acid can condense on or near a vessel wall, and corrode the vessel wall.

Accordingly, it is desirable to provide catalyst regeneration methods and apparatuses with corrosion inhibition. Furthermore, other desirable features and characteristics of the present invention will become apparent from the subsequent detailed description of the invention and appended claims, taken in conjunction with the accompanying drawings and this background of the invention.

BRIEF SUMMARY

Methods and apparatuses for regenerating catalysts and methods of inhibiting corrosion in catalyst regenerating apparatuses are provided. In an exemplary embodiment, an apparatus comprises: a metal vessel having an inner surface and configured to receive a spent catalyst stream and an oxygen-containing gas, and to provide an oxygen containing environment at a sufficiently high temperature to burn coke present on the spent catalyst stream and generate regenerated catalyst, wherein the spent catalyst stream comprises catalyst having coke deposits; a refractory material overlying at least a portion of an inner surface of the metal vessel; and a corrosion inhibiting material overlying at least a portion of the inner surface of the metal vessel and disposed between the inner surface and at least a portion of the refractory material, wherein the corrosion inhibiting material is heat stable at a temperature of at least up to about 400° F. (about 204° C.) and inhibits contact of an acid environment with the interior surface of the metal vessel.

In another embodiment, an exemplary method of inhibiting corrosion of a catalyst regenerating apparatus includes the steps of: providing a catalyst regenerator comprising a metal vessel with an inner surface; coating at least a portion of the inner surface with a corrosion inhibiting material, wherein the corrosion inhibiting material is heat stable at a temperature of at least up to about 400° F. (about 204° C.) and inhibits contact of an acid environment with the coated portion of the interior surface; and applying a refractory material overlying at least a portion of the corrosion inhibiting material.

In another embodiment, an exemplary method of regenerating a fluid catalytic cracking catalyst includes the steps of: introducing a spent catalyst stream into a catalyst regenerator, wherein the spent catalyst stream comprises spent catalyst having coke deposits, and contacting a portion of the spent catalyst stream with an oxygen containing environment at a sufficiently high temperature to burn coke present on the spent catalyst. In this embodiment, the catalyst regenerator includes: a metal vessel with an inner surface, a refractory material overlying at least a portion of the inner surface of the metal vessel; and a corrosion inhibiting material disposed between at least a portion of the inner surface of the metal vessel and at least a portion of the refractory material, wherein the corrosion inhibiting material is heat stable at a temperature of at least up to about 400° F. (about 204° C.) and inhibits contact of an acid environment with the contacted portion of the interior surface of the metal vessel.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Various embodiments provided herein relate to methods and apparatuses for the regeneration of FCC catalyst material with inhibition of corrosion of the regeneration vessel. The methods and apparatuses described herein utilize a corrosion inhibiting material disposed between at least a portion of the vessel wall and a refractory material to provide protection of the covered portion of the vessel wall against condensed sulfuric acid.

Figure 1:
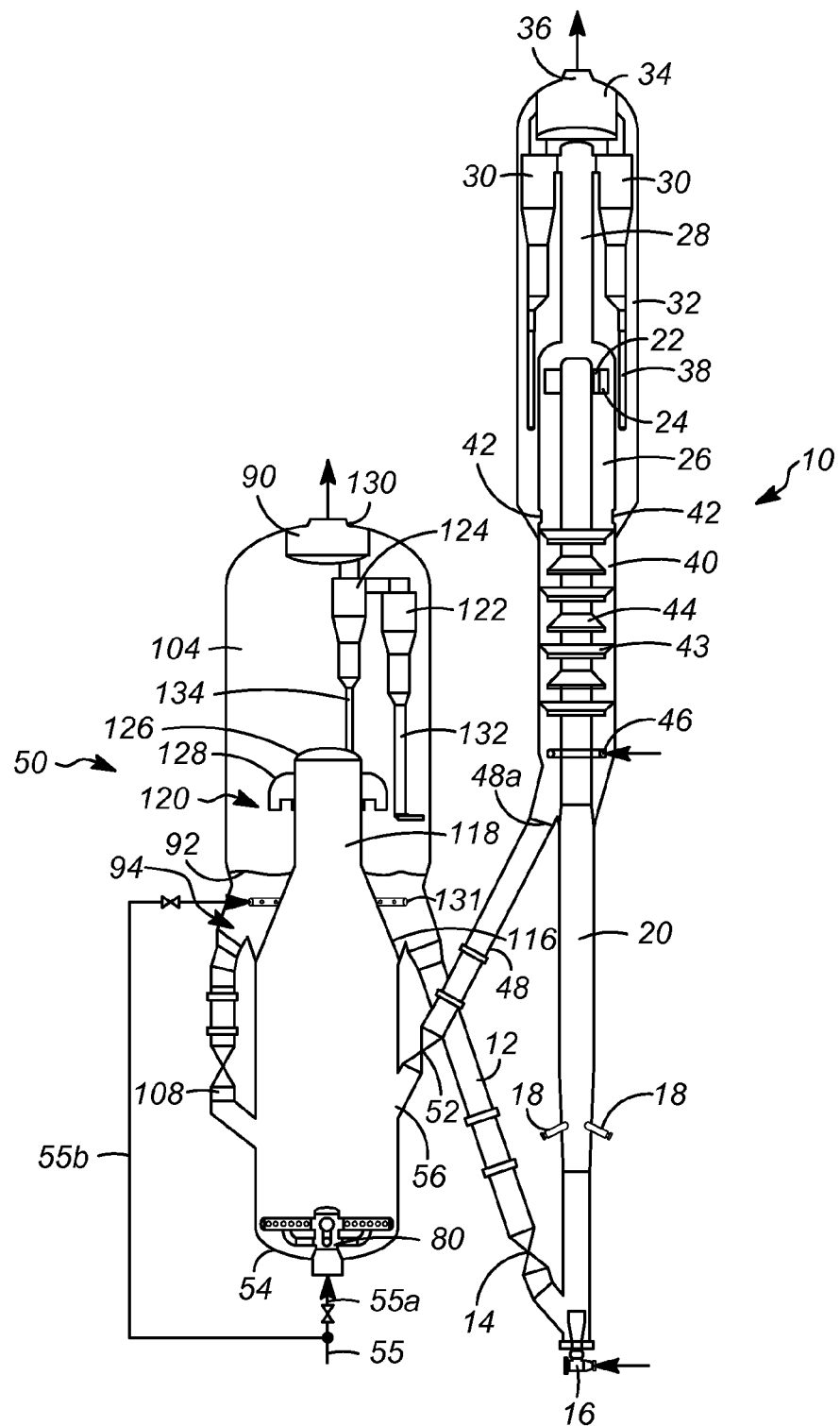
FIG. 1 is a cross-sectional view of an FCC unit including a catalyst regenerator with a portion of an interior surface coated with a layer of corrosion inhibiting material according to an exemplary embodiment provided herein.

Although other uses are contemplated, the process and apparatus of the present invention may be embodied in an FCC unit. FIG. 1 shows an exemplary FCC unit that includes a reactor section 10 and a regenerator vessel 50. A regenerated catalyst conduit 12 transfers regenerated catalyst from the regenerator vessel 50 at a rate regulated by a control valve 14 to a riser 20 of the reactor section 10. A fluidization inert gaseous medium such as steam from a nozzle 16 transports regenerated catalyst upwardly through the riser 20 at a relatively high density until a plurality of feed injection nozzles 18 inject hydrocarbon feed across the flowing stream of catalyst particles. The catalyst contacts the hydrocarbon feed and cracks it to produce smaller, cracked hydrocarbon products while depositing coke on the catalyst to produce spent catalyst.

Any conventional FCC feedstock or higher boiling hydrocarbon feedstock is a suitable feed. Among the most common of such conventional feedstocks is a "vacuum gas oil" (VGO), which is typically a hydrocarbon material having a boiling range of from 650 to 1025° F. (343 to 552° C.) prepared by vacuum fractionation of atmospheric residue. Such a fraction is generally low in coke precursors and heavy metal contamination which can serve to contaminate catalyst. Heavy hydrocarbon feedstocks which may also be used include heavy bottoms from crude oil, heavy bitumen crude oil, shale oil, tar sand extract, deasphalted residue, products from coal liquefaction, atmospheric and vacuum reduced crudes. In some embodiments, heavy feedstocks also include mixtures of the above hydrocarbons and the foregoing list is not limited to those feedstocks specified herein.

In the exemplary embodiment shown in FIG. 1, the resulting mixture continues upwardly through the riser 20 to a top at which a plurality of disengaging arms 22 tangentially and horizontally discharge the mixture of gas and catalyst from a top of the riser 20 through ports 24 into a disengaging vessel 26 that effect separation of gases from the catalyst. A transport conduit 28 carries the hydrocarbon vapors, including stripped hydrocarbons, stripping media and entrained catalyst to one or more cyclones 30 in a reactor vessel 32 which separate spent catalyst from the hydrocarbon vapor stream. The reactor vessel 32 may at least partially contain the disengaging vessel 26 and the disengaging vessel 26 is considered part of the reactor vessel 32. A collection chamber 34 in the reactor vessel 32 gathers the separated hydrocarbon vapor streams from the cyclones 30 for passage to an outlet nozzle 36 and eventually into a fractionation recovery zone (not shown). Diplegs 38 discharge catalyst from the cyclones 30 into a lower portion of the reactor vessel 32 that eventually passes the catalyst and adsorbed or entrained hydrocarbons into a stripping section 40 of the reactor vessel 32 across ports 42 defined in a wall of the disengaging vessel 26. Catalyst separated in the disengaging vessel 26 passes directly into the stripping section 40. The stripping section 40 contains baffles 43, 44 or other equipment to promote mixing between a stripping gas and the catalyst. The stripping gas enters a lower portion of the stripping section 40 through a conduit to one or more distributors 46. The spent catalyst leaves the stripping section 40 of the reactor vessel 32 through a reactor catalyst conduit 48 which delivers it to the regenerator vessel 50 at a rate regulated by a control valve 52. The spent catalyst from the reactor vessel 32 usually contains carbon in an amount of about 0.2 to about 2 wt. %, which is present in the form of coke. Although coke is primarily composed of carbon, it may contain about 3 to about 12 wt. % hydrogen as well as sulfur and other materials. The reactor catalyst conduit 48 with an inlet 48a in downstream communication with the reactor vessel 32 may deliver spent catalyst to the regenerator vessel 50.

FIG. 1 shows an embodiment of a regenerator vessel 50 that is a combustor type of regenerator. However, other types of catalyst regenerators may be suitable applications for the present invention. Spent catalyst regulated by control valve 52 descends in the reactor catalyst conduit 48 and enters a lower or first chamber 54 of the combustor regenerator vessel 50 through catalyst inlet 56.

Oxygen-containing combustion gas, typically air, from a combustion gas line 55 is primarily delivered to the regenerator vessel 50 by a combustion gas distributor 80 below the catalyst mixer 60. In an embodiment, combustion gas distributor 80 distributes most of the combustion gas to the regenerator vessel 50 and is fed by a distributor gas line 55a from combustion gas line 55.

Again in the embodiment shown in FIG. 1, the combustion gas distributor 80 distributes gas from distributor gas line 55a to the lower chamber 54 of the regenerator vessel. The oxygen in the combustion gas contacts the spent catalyst and combusts carbonaceous deposits from the catalyst to regenerate the catalyst and generate flue gas. If air is the combustion gas, typically 13-15 kg of air is required per kilogram of coke fed on catalyst to the regenerator. In some embodiments, pressure in the regenerator vessel 50 is about 173 to about 414 kPa (gauge) (about 25 to about 60 psig). The superficial velocity of the combustion gas is typically less than 1.7 m/s (5.5 ft/s) and the density of the dense bed is typically greater than 320 kg/m$^3$ (20 lb/ft$^3$) depending on the characteristics of the catalyst. Regions inside the regenerator vessel 50 where carbonaceous deposits are undergoing combustion may be at a temperature of about 932° F. to about 1652° F. (about 500° C. to about 900° C.) and usually about 1112° F. to about 1382° F. (about 600° C. to about 750° C.).

During combustion, the mixture of catalyst and gas in the lower chamber 54 ascend through a frustoconical transition section 116 to the transport riser section 118 of the lower chamber 54. The riser section defines a tube and extends upwardly from the lower chamber 54. The mixture of catalyst and gas travels at a higher superficial gas velocity than in the lower chamber 54 due to the reduced cross-sectional area of the riser section 118 relative to the cross-sectional area of the lower chamber 54 below the transition section 116.

The regenerated catalyst and flue gas are transported from the first or lower chamber 54 into an upper or second chamber 104. The second chamber is defined by a metal vessel, with an inner surface 94 facing the interior of the vessel. In some embodiments, a refractory material (not shown in FIG. 1) is overlying the inner surface 94. In embodiments, this refractory material may comprise any refractory material conventionally used in catalyst regenerators. As used herein, the term "overlying" is used to encompass both "over" and "on". In this regard, one feature that overlies a second feature may include intervening features, such as one or more distinct layers, interposed between the one feature and the second feature within the scope of the term "overlying." Alternatively, the one feature may be formed directly on a surface of the second feature within the scope of the term "overlying."

The mixture of catalyst particles and flue gas is discharged from an upper portion of the riser section 118 into the upper chamber 104 which is in downstream communication with the lower chamber 54. Substantially completely regenerated catalyst may exit the top of the riser section 118, but arrangements in which partially regenerated catalyst exits from the lower chamber 54 are also contemplated. Discharge is effected through a disengaging device 120 that separates a majority of the regenerated catalyst from the flue gas upon entry into the second chamber 104. Initial separation of catalyst upon exiting the riser section 118 minimizes the catalyst loading on cyclone separators 122, 124 or other downstream devices used for the essentially complete removal of catalyst particles from the flue gas, thereby reducing overall equipment costs. In an embodiment, catalyst and gas flowing up the riser section 118 impact a top elliptical cap 126 of the riser section 118 and reverse flow. The catalyst and gas then exit through downwardly directed openings in radial disengaging arms 128 of the disengaging device 120. In some embodiments, the sudden loss of momentum and downward flow reversal cause at least about 70 wt. % of the heavier catalyst to fall to a dense catalyst bed 92 and the lighter flue gas and a minor portion of the catalyst still entrained therein to ascend upwardly in the upper or second chamber 104. Downwardly falling, disengaged catalyst collects in the dense catalyst bed 92. In an embodiment, catalyst densities in the dense catalyst bed 92 are typically kept about 640 kg/m³ to about 960 kg/m³ (about 40 kg/m³ to about 60 lb/ft³).

A fluidizing gas line 55b delivers fluidizing gas to the dense catalyst bed 92 through a fluidizing distributor 131. Fluidizing gas may be combustion gas, typically air, and may branch from combustion gas line 55. In combustor regenerator vessel 50, in which full combustion of coke is effected in the lower chamber 54, approximately no more than about 2 wt. % of the total gas requirements within the process enters the dense catalyst bed 92 through the fluidizing distributor 131 with the remainder being added to the lower chamber 54. In this embodiment, gas is added to the upper chamber 104, not for combustion purposes, but for fluidizing purposes so the catalyst will fluidly exit through the catalyst conduits 108 and 12.

If air is the combustion gas, typically 13 to 15 kg of air is required per kilogram of coke fed on catalyst to the regenerator. In an embodiment, the combustor regenerator vessel 50 has a temperature of about 1100° F. to about 1300° F. (about 593° C. to about 704° C.) in the lower chamber 54 and about 1200° F. to about 1400° F. (about 649° C. to about 760° C.) in the upper chamber 104. Pressure may be between 173 and 414 kPa (gauge) (25 to 60 psig) in both chambers.

The combined flue and fluidizing gas and entrained particles of catalyst enter one or more separation means, such as the cyclone separators 122, 124, which separates catalyst fines from the gas. Flue gas, relatively free of catalyst is collected in a collector 90 and is withdrawn from the combustor regenerator vessel 50 through an exit conduit 130 while recovered catalyst is returned to the dense catalyst bed 92 through respective diplegs 132, 134. Catalyst from the dense catalyst bed 92 is transferred through the regenerated catalyst conduit 12 back to the reactor section 10 where it again contacts feed as the FCC process continues.

As indicated above, the accumulation of catalyst in the dense catalyst bed 92 increases the susceptibility of stagnant pockets of catalyst material, particularly at or near an inner surface 94 of the second chamber 104. Such stagnant pockets can act as insulative material, leading to cooling at or near the inner surface 94 of the second chamber 104. In some instances, cooling can occur such that portions of the vessel wall, particularly in the vicinity of the dense catalyst bed 92, may approach a temperature of about 500° F. to about 100° F., such as about 400° F. to about 100° F., such as about 400° F. to about 200° F., below the dew point of sulfuric acid under the conditions within the regenerator vessel 50. When this happens, sulfuric acid can condense and attack the inner surface 94 of the second chamber 104.

Figure 2:
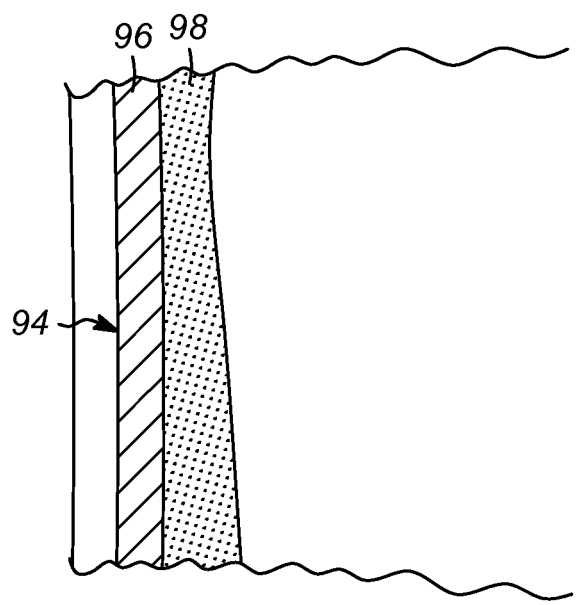
FIG. 2 is a cross-sectional view of a catalyst regenerator metal vessel wall coated with a corrosion inhibiting material and a refractory material according to an exemplary embodiment provided herein.

To combat this problem, in embodiments, at least a portion of the inner surface 94 of the second chamber 104 is coated with a layer of corrosion inhibiting material that provides a physical barrier to reduce or prevent contact of condensed sulfuric acid with the inner surface 94. In some embodiments, the corrosion inhibiting material comprises a material that is heat stable at a temperature from about 100° F. to about 500° F. (about 38° C. to about 260° C.), such as from about 100° F. to about 400° F. (about 38° C. to about 204° C.), and inhibits contact of an acid environment with the coated portion of inner surface 94 within this temperature range. A cross-sectional view of an exemplary layer system is shown in FIG. 2, where a layer of corrosion inhibiting material 96 is shown to be in contact with a portion of the inner surface 94, and interposed between the inner surface 94 and a layer of refractory material 98. In some embodiments, the portion of the inner surface 94 that is coated with the layer of corrosion inhibiting material 96 comprises a portion of the inner surface 94 that is in contact with accumulated regenerated catalyst (e.g., the dense catalyst bed 92) or any other region of the inner surface 94 that may be facing a region of the catalyst regenerator that is potentially subject to accumulation of stagnant catalyst particles. Note that in some embodiments the corrosion inhibiting material 96 overlies, but is not necessarily in contact with, the portion of the inner surface 94.

In some embodiments, the corrosion inhibiting material is applied as a hydrophobic coating. In some embodiments, the corrosion inhibiting material comprises an asphalt. In some embodiments, the corrosion inhibiting material comprises about 20 wt. % to about 60 wt. % asphalt. In some embodiments, the corrosion inhibiting material comprises asphalt and is formulated for high temperature applications (e.g., conventional mastic formulations for application on a surface with a working temperature of at least up to about 400° F.). In some embodiments, the corrosion inhibiting material comprises a coal tar based formulation. As used herein the term "asphalt" means a dark bituminous pitch. As used herein the term "bituminous pitch" means a mixture of viscous and solid hydrocarbons that occur naturally in asphalt, tar, mineral waxes, etc.

As will be understood, the methods and apparatuses provided herein are not intended to be limited to the means by which the corrosion inhibiting material is applied to the inner surface of the catalyst regenerator chamber. Rather, it is intended that the corrosion inhibiting material be applied by any conventional technique, including spraying or brushing, that is suitable for the particular corrosion inhibiting material being applied. Further, as will be appreciated, mixtures containing asphalt (e.g., conventional mastic materials) typically require a curing period (e.g., of up to about 24 hours) for solvents to evaporate before being subjected to elevated temperatures, such as the operational temperatures of a catalyst regenerator.

Also, presentation of the above exemplary embodiment of an apparatus as a part of a larger FCC system including a FCC reactor is not intended to be limiting. In various embodiments, catalyst regenerator apparatuses may be stand-alone apparatuses, or may be as above, incorporated into a variety of FCC systems. Thus, while at least one exemplary embodiment has been presented in the foregoing detailed description of the invention, it should be appreciated that a vast number of variations exist. It should also be appreciated that the exemplary embodiments described above are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A catalyst regenerating apparatus comprising:
   a metal vessel having an inner surface and configured to receive a spent catalyst stream and an oxygen-containing gas, and to provide an oxygen containing environment at a sufficiently high temperature to burn coke present on the spent catalyst stream and generate regenerated catalyst, wherein the spent catalyst stream comprises catalyst having coke deposits;
   a refractory material overlying at least a portion of the inner surface of the metal vessel; and
   a corrosion inhibiting material overlying at least a portion of the inner surface of the metal vessel and disposed between the inner surface and at least a portion of the refractory material, wherein the corrosion inhibiting material is heat stable at a temperature of at least up to about 400° F. (about 204° C.) and inhibits contact of an acid environment with the inner surface of the metal vessel.

2. The catalyst regenerating apparatus of claim 1, wherein at least a region of the metal vessel is configured to receive and accumulate regenerated catalyst.

3. The catalyst regenerating apparatus of claim 2, wherein at least a portion of the inner surface coated with the corrosion inhibiting material faces the region of the metal vessel configured to receive and accumulate regenerated catalyst.

4. The catalyst regenerating apparatus of claim 1, wherein the corrosion inhibiting material comprises a coal tar based formulation.

5. The catalyst regenerating apparatus of claim 1, wherein the corrosion inhibiting material is a hydrophobic coating.

6. The catalyst regenerating apparatus of claim 1, wherein the corrosion inhibiting material comprises asphalt.

7. The catalyst regenerating apparatus of claim 1, wherein the corrosion inhibiting material comprises about 20 wt. % to about 60 wt. % asphalt.

8. A method of regenerating a fluid catalytic cracking catalyst, said method comprising the steps of:
   introducing a spent catalyst stream into a catalyst regenerator, wherein the spent catalyst stream comprises spent catalyst having coke deposits, and wherein the catalyst regenerator comprises:
   a metal vessel with an inner surface,
   a refractory material overlying at least a portion of the inner surface of the metal vessel;
   a corrosion inhibiting material disposed between at least a portion of the inner surface of the metal vessel and at least a portion of the refractory material, wherein the corrosion inhibiting material is heat stable at a temperature of at least up to about 400° F. (about 204° C.), and inhibits contact of an acid environment with the portion of the inner surface of the metal vessel contacted by the corrosion inhibiting material; and
   contacting a portion of the spent catalyst stream with an oxygen containing environment at a sufficiently high temperature to burn coke present on the spent catalyst.

9. The method of claim 8, wherein introducing the spent catalyst stream into the catalyst regenerator comprises introducing a spent catalyst stream from a fluid catalytic cracking reactor into the catalyst regenerator.

10. The method of claim 8, wherein introducing the spent catalyst stream into the catalyst regenerator comprises introducing the spent catalyst stream into a catalyst regenerator comprising a metal vessel with at least a region of the metal vessel configured to receive and accumulate regenerated catalyst.

11. The method of claim 10, wherein introducing the spent catalyst stream into the catalyst regenerator comprises introducing the spent catalyst stream into the catalyst regenerator, wherein at least a portion of the inner surface in contact with the corrosion inhibiting material faces the region of the metal vessel configured to receive and accumulate regenerated catalyst.

12. The method of claim 8, wherein introducing the spent catalyst stream into the catalyst regenerator comprises introducing the spent catalyst stream into the catalyst regenerator comprising an inner surface, at least a portion of which is in contact with a corrosion inhibiting material comprising asphalt.

13. The method of claim 8, wherein introducing the spent catalyst stream into the catalyst regenerator comprises introducing the spent catalyst stream into the catalyst regenerator comprising an inner surface, at least a portion of which is overlied with a corrosion inhibiting material comprising about 20 wt. % to about 60 wt. % asphalt.

* * * * *